UNITED STATES PATENT OFFICE.

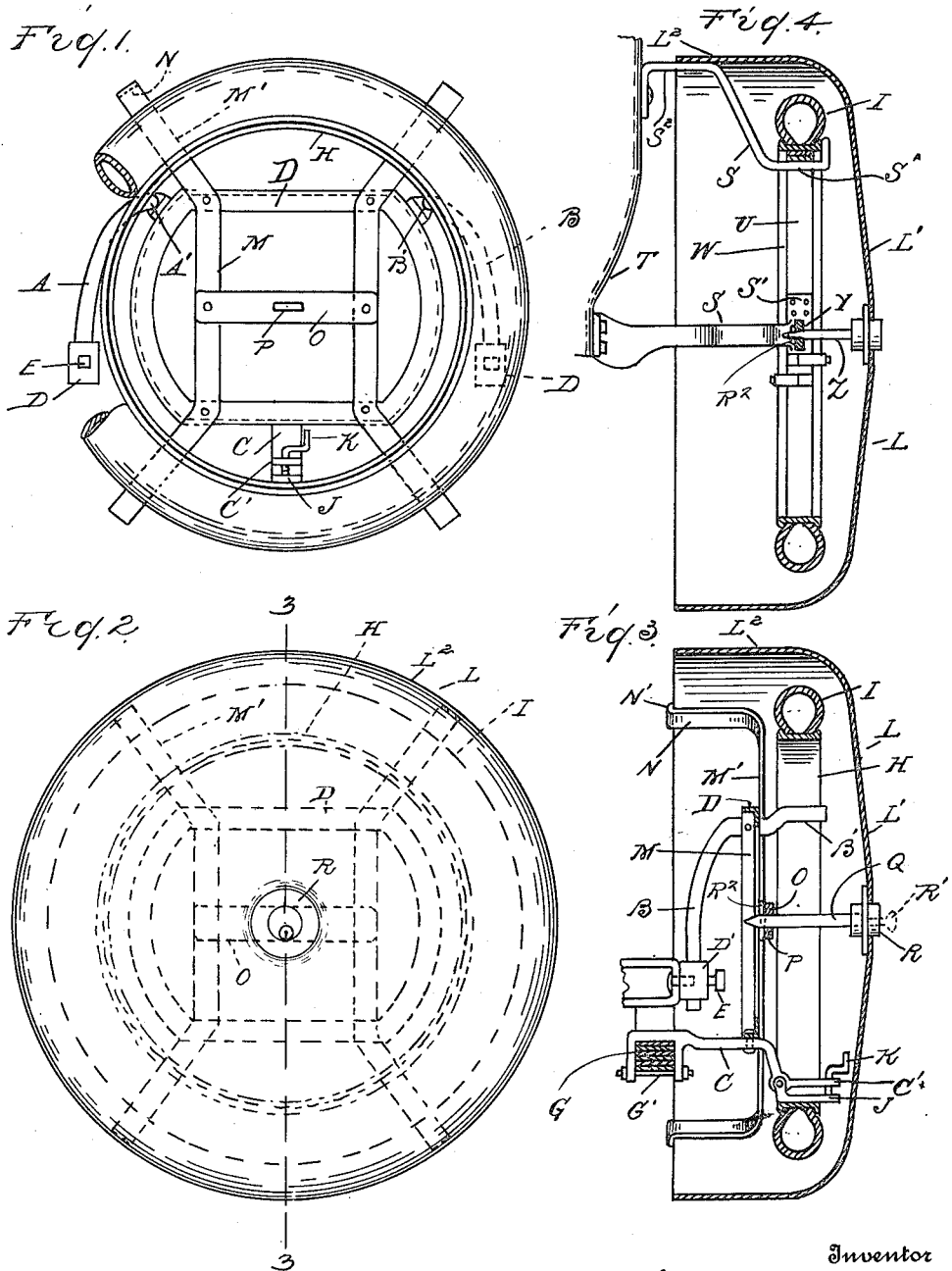

HARRY B. TUTTLE, OF JEANNETTE, PENNSYLVANIA.

TIRE CARRIER.

1,423,699.  Specification of Letters Patent.  Patented July 25, 1922.

Application filed November 10, 1919. Serial No. 337,079.

*To all whom it may concern:*

Be it known that I, HARRY B. TUTTLE, a citizen of the United States of America, residing at Jeannette, in the county of Westmoreland and State of Pennsylvania, have invented certain new and useful Improvements in Tire Carriers, of which the following is a specification, reference being had therein to the accompanying drawings.

This invention relates to spare tire carriers, and it is the object of the invention to provide a cover member attachable to a tire carrier to protect the spare tire from dust and dirt and to prevent theft or accidental loss of the tire.

A further object is to utilize such a cover member to prevent access to the fastenings by which the tire carrier is mounted upon a vehicle.

The invention consists in the structural features and arrangements of parts hereinafter fully set forth.

In the drawings:

Figure 1 is a view in front elevation of a spare tire carrier, omitting the cover member;

Figure 2 is a similar view of the same with the cover member applied thereto;

Figure 3 is a vertical sectional view taken on line 3—3 of Figure 2;

Figure 4 is a view similar to Figure 3 disclosing an alternative form of the invention.

In these views the reference characters A, B and C designate respectively three bracket members mounted upon a motor vehicle (not shown) at the rear thereof and having the parallel rear end portions $A'$, $B'$, and $C'$. Adjacent said end portions an open angle iron frame D is engaged between and secured to said brackets to reinforce the same and rigidly maintain their proper spaced relation. The bracket members A and B respectively engage sockets $D'$, in which they are held by set screws E, said sockets being secured to the vehicle frame F. The bracket C is secured to the platform spring G of the vehicle by a bolt or other fastening means $G'$. The end portions $A'$, $B'$ and $C'$ provide a three point support for a demountable rim, as is shown at H, a tire I being disclosed upon said rim. Preferably the end portion $C'$ does not directly engage the rim H but has pivoted thereto the clamping arm J which is adapted to be adjusted into firm engagement with said rim by a crank handle screw K engaged in the extremity $C'$.

The cover member for the spare tire and rim is indicated at L and comprises the slightly conical body portion $L'$ and the cylindrical marginal portion $L^2$. Said cover member may be supported upon the tire carrier by various means, as for example by extending bars M vertically across the frame D at each side thereof and bending the extremities of said bars radially, as indicated at $M'$. Said radial portions terminate in forwardly projecting portions N parallel to the parts $A'$, $B'$, and $C'$ and having the offset extremities $N'$ forming abutments for the cover member which rests upon the parts N. By mounting the cover member, as described, the same prevents ready access to the fastening means whereby the brackets A, B and C are attached to the vehicle. Preferably, the diameter of the cover member is such as to accommodate the largest size of tires that may be mounted upon the tire carrier. Centrally of the tire carrier a horizontal bar O is secured to the vertical bars M, and is centrally slotted, as indicated at P. The cover member interiorly carries the axially arranged stem Q rotatably actuable by the barrel of an ordinary lock R which passes centrally through the body portion $L'$ of the cover member and is engageable by a suitable key, as is indicated in dash lines at $R'$ (see Figure 3). Adjacent its free extremity the stem Q carries a cross pin $R^2$, which in one rotative position of said stem registers with the slot P and is adapted to pass through said slot as the cover member is being engaged with its supports N. After the cover member is in proper position the stem is turned through a quarter turn whereby the pin $R^2$ is disposed transversely of the slot P and thus prevents removal of the cover member, except by persons having a key to fit the lock R.

In the modified form of the invention shown in Figure 4 the cover member is substantially the same as has been described. In this instance, however, the tire carrier comprises a number of brackets S, secured at one end to the body T, of a vehicle, and at their other ends terminating in plates $S'$, to which there is secured a semicircular band U upon which may be carried the demountable spare rim W. Said brackets are shaped to establish a comparatively large spaced relation between their base portions S² so as to provide a support for the cylindrical marginal portion of the cover member. The band U carries the diametrical cross bar Y which is engaged by a stem Z carried by the cover member, as in the first described form of the invention.

When the described cover member is in its position of use the spare tire and rim are fully protected from dust and dirt, as well as against theft or accidental loss, since it is impossible to gain access to said rim and tire without removal of said cover member, and such removal is prevented by the lock R. In both forms of the invention it is an important feature that the cover member when applied serves not only to prevent removal of the spare tire and rim from the carrier, but also prevents detachment of the tire from the vehicle.

What I claim as my invention is:

1. In a device of the character described, the combination with a spare tire carrier, of a sheet metal cover member for the spare tire comprising a central disk portion and an annular rim portion, the latter portion being proportioned to embrace the tire, a latch member centrally carried by said disk portion engageable with the tire carrier to attach the cover member thereto, and a lock upon the cover member for actuating said latch member.

2. In a device of the character described, the combination with a spare tire carrier comprising an annular member providing a seat for the spare tire, and a slotted bar extending diametrically of said annular member, of a cover member for the spare tire comprising a central disk portion and an annular rim portion, said rim portion embracing the tire, and a latch member centrally carried by the cover member engageable with the slot of said bar to secure the cover member to the tire holder.

3. In a device of the character described, the combination with a cover member for a spare tire, of a plurality of brackets secured to a vehicle and having portions equidistant from the axis of the tire carrier providing a seat for said cover member, and having portions spaced a lesser distance from said axis providing a support for the tire.

4. In a device of the character described, the combination with a cover member for a spare tire, of a plurality of brackets having extremities secured to a vehicle, and having portions adjacent said secured ends equidistant from a common axis, and providing a seat for said cover member, the free ends of said brackets being spaced a lesser distance from said axis and forming a support for the tire.

5. In a device of the character described, the combination with a cover member for a spare tire, of a plurality of brackets secured to a vehicle, and having portions equidistant from the axis of the tire carrier providing a seat for said cover member, and having portions spaced a lesser distance from said axis providing a support for the tire, a member carried by said brackets located substantially at said axis, and means for locking the cover to said member.

6. In a device of the character described, the combination with a spare tire carrier member having a cover member with a rim portion for surrounding the tire, of a plurality of bracket members secured to a vehicle and interiorly engaging said rim portion to support the cover member, and means carried by said brackets within said cover member providing a support for the tire.

7. In a device of the character described, the combination with a plurality of bracket members secured to and projecting from a vehicle, of a spare tire cover member comprising a rim portion engaging said brackets, and a front portion transverse of the brackets, said rim portion projecting from the front portion toward the vehicle and being open toward the latter, and means within said cover member providing a support for a spare tire.

8. In a device of the character described, the combination with a plurality of bracket members, of a spare tire cover member comprising a front portion and a rim portion engaging said brackets and connected at one side to said front portion and open at its other side, means securing said brackets to the vehicle disposed between the front portion of said cover member and the vehicle, and supporting means for the spare tire carried by said brackets within said cover member.

In testimony whereof I affix my signature.

HARRY B. TUTTLE.